Jan. 24, 1961     F. B. RYKOSKEY ET AL     2,969,259
RAILWAY AXLE JOURNAL BEARING
Filed Nov. 15, 1957
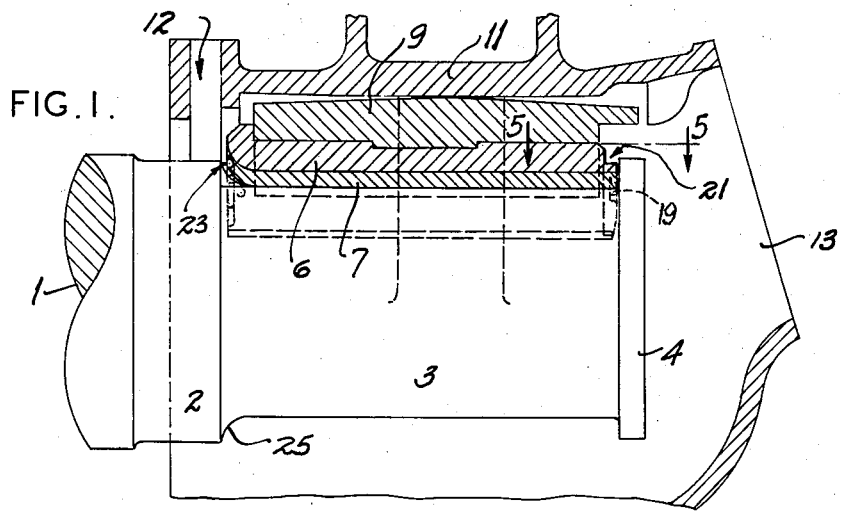
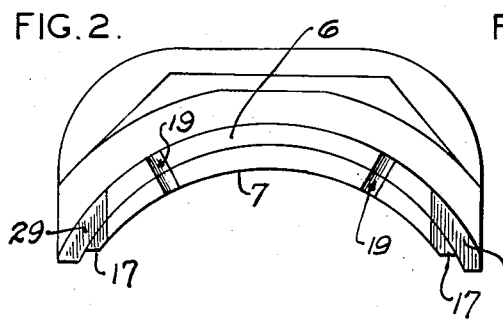
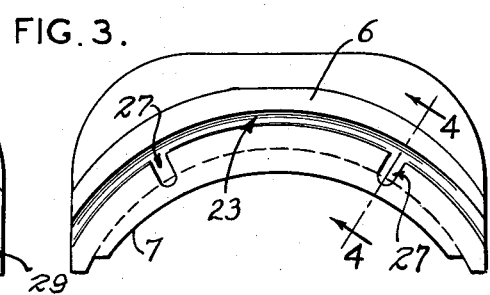
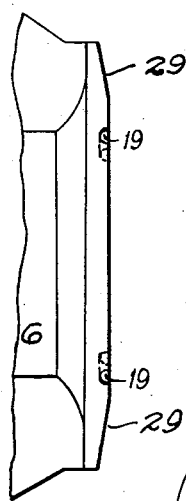
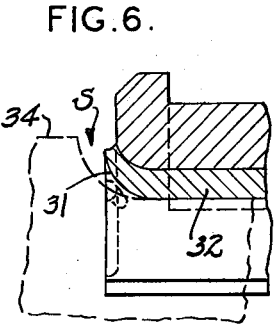
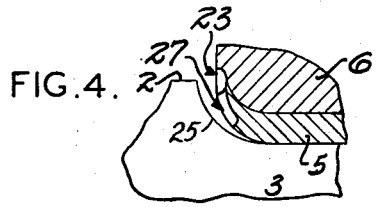
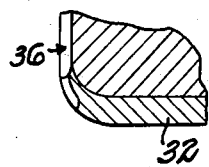
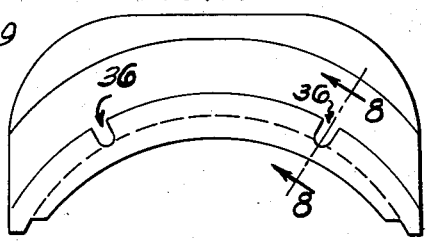

United States Patent Office 2,969,259
Patented Jan. 24, 1961

2,969,259

RAILWAY AXLE JOURNAL BEARING

Francis B. Rykoskey, Lutherville, and William A. Mullen, Catonsville, Md. (Both % Baltimore and Ohio Railroad, Baltimore, Md.)

Filed Nov. 15, 1957, Ser. No. 696,734

5 Claims. (Cl. 308—79.1)

The invention relates to railway rolling stock axle journal and bearing assembly whereby the load-mounting boxes are carried on the journals by solid bearings lubricated with oil supplied from the bottom of the box to the journal by waste or lubricating device.

One of the long-standing and troublesome problems attending this equipment is the loss of oil by its travel lengthwise of the journal beyond the ends of the bearing. This travel and loss is due partly to the squeezing of the oil between the bearing and the journal, but largely because of the "pumping action" resulting from the longitudinal play between the bearing and the journal whereby surplus lubricant between the end of the bearing and the opposing collar or fillets at dust guard fit on the axle is forced lengthwise over the collar and dust guard fit which is also termed the dry seat.

The main object of the invention is to avoid this pumping action and drain the lubricant back to the sides of the journal below the bearing and into the sump formed by the bottom of the box.

In the accompanying drawings illustrating preferred embodiments of the invention:

Figure 1 is a vertical longitudinal section through the upper portion of an Association of American Railroads (A.A.R.) journal box, showing the journal, the journal bearing and wedge in the usual assembly, but with a bearing recessed and grooved as explained below.

Figure 2 is an elevation of the front end of the bearing but drawn to a larger scale.

Figure 3 is an elevation of the rear end of the bearing.

Figure 4 is a detail longitudinal section on line 4—4 of Figure 3.

Figure 5 is a top view of the forward end of the bearing as indicated at line 5—5 in Figure 1.

Figure 6 corresponds to Figure 4 but illustrates another form of the invention.

Figure 7 corresponds to Figure 3 but illustrates the structure shown in Figure. 6.

Figure 8 is a detail longitudinal section on line 8—8 of Figure 7.

Axle 1 terminates in a dust guard seat 2, a journal 3 and a collar 4, as are in common use. The bearing includes a back 6 of cast iron or bronze and a liner 7 of relatively softer material which is poured into the back and united therewith by suitable interface brazing. A wedge 9 is carried on back 6 and supports the top wall 11 of the journal box which has a dust guard pocket 12 at its rear end and an opening 13 at its forward end for application and removal of the bearing, wedge, and waste packing or lubricating device (not shown).

All the above parts follow well-known standards except that the bearing is shaped, preferably but not necessarily at both ends, so that there is a recess extending inwardly lengthwise of the bearing from each end of the bearing and arcuately of the journal axis from one side edge of the bearing to the other side edge of the bearing. The recesses are opposite to the adjacent portions of the axle dust guard seat and the axle collar respectively and the inner radius of each recess is shorter than the radius of the dust guard seat and collar respectively so that the recess is arranged for draining lubricant back to the journal box. One or more grooves 19 extend radially of one outer end of the liner and are projected through the adjacent portion of back 6. The outer end of back 6 has a reduced radius providing a recess 21 between the periphery of collar 4 and that portion of the back which extends radially beyond the collar. Recess 21 provides free drainage of oil trapped between the end of the bearing and collar 4 and conveys the lubricant down to the side edges of the liner from whence it may flow along the journal or into the surrounding waste or lubricating device without being subject to any tendency to be discharged over the end of the journal and onto the lid or through the lid opening.

The rear end of the liner has a recess 23 (Figure 1) facing journal fillet 25 and receiving lubricant between the end of the bearing and the fillet and freely draining it down to the side edges of the liner. Radial grooves 27 (Figures 3, 4) intersect recess 23 and facilitate return to the recess of any oil tending to accumulate on the dry seat. Radial grooves 19 and 27 may be termed wiping grooves.

Preferably the outer ends of the liner and back near the side edges have been bevelled rearwardly at 29 (Figure 5) to eliminate wiping action by their outer edges and to facilitate the flow of lubricant from the packing into the bearing surface between the axle collar and the bearing.

Figures 6, 7 and 8 illustrate a variation in the rear end of the bearing in which the periphery of the upturned end 31 of the liner is reduced in diameter so that it is less than the diameter of dry seat 34, thus providing increased space S between the end of the bearing and the journal fillet for trapping and returning lubricant to the lower edges of the liner 32. Radial grooves 36 further avoid the tendency of pumping action because of end thrust between the bearing and the dry seat fillet and allow any lubricant gathered on the dry seat to reenter between the bearing and the fillet.

The details of the structure may be further modified without departing from the spirit of the invention and the exclusive use of structure coming within the scope of the claims is contemplated.

What is claimed is:

1. A railway axle journal friction bearing, comprising a back and a liner, the liner having a journal-engaging surface arcuate in cross section transversely of the surface axis from side edge to side edge of the liner, and extending straight substantially throughout the length of the bearing but terminating at one end in an upwardly and outwardly convex rounded face, there being a downwardly and outwardly facing recess in the end portion of said liner face extending arcuately from side to side of the liner and substantially concentric with said journal-engaging surface for draining oil from the end of the liner to the lower side edges of the liner.

2. A railway axle journal friction bearing according to claim 1 which includes a lubricant wiping groove in the end portion of the liner extending substantially radially of the liner and intersecting the lower part of said recess.

3. A railway axle journal friction bearing according to claim 1 in which a lubricant wiping groove extends substantially radially of the arcuate journal-engaging surface across the end of the liner and the adjacent portion of the back and intersects said recess.

4. In combination, a railway axle having a journal, there being a collar at one end of the journal extending radially of the latter and a dust guard seat at the other end of the journal extending radially of the latter, there being a fillet between the journal and said seat, and a friction bearing mounted on said journal, the length of the bearing being less than the distance between said collar and seat, the bearing being of arcuate cross section transversely of its length, the bearing including a back and a liner of softer metal than the back, the liner having a recess in its end opposing said fillet and extending inwardly from the end of the liner from side edge to side edge of the bearing and extending concentric with the journal and spaced closer to the journal axis than the periphery of the dust guard seat and facing downwardly toward the journal.

5. A combination according to claim 4 in which the recessed end of the liner has grooves extending radially of the bearing arc and intersecting the recess.

References Cited in the file of this patent

UNITED STATES PATENTS

| | | |
|---|---|---|
| 2,387,807 | Pearce | Oct. 30, 1945 |
| 2,449,895 | Hennessy | Sept. 21, 1948 |
| 2,592,294 | Korn | Apr. 8, 1952 |

FOREIGN PATENTS

| | | |
|---|---|---|
| 11,221 | Great Britain | 1914 |
| 371,697 | Germany | Mar. 17, 1923 |
| 464,092 | Germany | Nov. 30, 1928 |
| 655,118 | France | Dec. 8, 1928 |